US011947394B2

(12) United States Patent
Chung

(10) Patent No.: US 11,947,394 B2
(45) Date of Patent: Apr. 2, 2024

(54) METHOD FOR FOLDING FOLDABLE DISPLAY DEVICE AND FOLDABLE DISPLAY DEVICE

(71) Applicant: Min Woo Chung, Jinju-si (KR)

(72) Inventor: Min Woo Chung, Jinju-si (KR)

( * ) Notice: Subject to any disclaimer, the term of this patent is extended or adjusted under 35 U.S.C. 154(b) by 0 days.

(21) Appl. No.: 18/042,184

(22) PCT Filed: Jul. 28, 2021

(86) PCT No.: PCT/KR2021/009807
§ 371 (c)(1),
(2) Date: Feb. 17, 2023

(87) PCT Pub. No.: WO2022/045600
PCT Pub. Date: Mar. 3, 2022

(65) Prior Publication Data
US 2023/0418332 A1 Dec. 28, 2023

(30) Foreign Application Priority Data
Aug. 31, 2020 (KR) .......... 10-2020-0110036

(51) Int. Cl.
G06F 1/16 (2006.01)
G09F 9/30 (2006.01)
(Continued)

(52) U.S. Cl.
CPC .......... *G06F 1/1641* (2013.01); *G06F 1/1616* (2013.01); *G06F 1/1681* (2013.01);
(Continued)

(58) Field of Classification Search
CPC .... G06F 1/1641; G06F 1/1616; G06F 1/1681; G09F 9/301; G09F 9/3023; G09F 15/0062; H04M 1/0214
(Continued)

(56) References Cited

U.S. PATENT DOCUMENTS 6,532,146 B1 * 3/2003 Duquette .............. G06F 1/1607
361/679.04
9,801,290 B2 * 10/2017 Ahn ..................... H05K 5/0017
(Continued)

FOREIGN PATENT DOCUMENTS

JP 2006-287982 A 10/2006
KR 10-2016-0046874 A 4/2016
(Continued)

*Primary Examiner* — Tom V Sheng
(74) *Attorney, Agent, or Firm* — NKL LAW; Jae Youn Kim

(57) ABSTRACT

Provided is a method for folding a foldable display device, in which the foldable display device includes a base panel plate, wherein a second panel plate hinged to one side of the base panel plate is folded, and a first panel plate hinged to the other side of the base panel plate is folded, and the first and second panel plates are unfolded, so that portions of a display panel, which are repeatedly folded and unfolded, can be stably supported, the display panel can be prevented from being damaged, and a thickness of the foldable display device can be thinner than a foldable smartphone folded once so that a volume thereof can be minimized, thereby providing a display panel that becomes wider when the first and second panel plates are unfolded.

4 Claims, 3 Drawing Sheets

(51) Int. Cl.
  *G09F 9/302* (2006.01)
  *G09F 15/00* (2006.01)
  *H04M 1/02* (2006.01)
(52) U.S. Cl.
  CPC ............ *G09F 9/301* (2013.01); *G09F 9/3023* (2013.01); *G09F 15/0062* (2013.01); *H04M 1/0214* (2013.01)
(58) Field of Classification Search
  USPC .......................................................... 345/13
  See application file for complete search history.

(56) References Cited

U.S. PATENT DOCUMENTS

| | | | | |
|---|---|---|---|---|
| 11,048,299 | B2* | 6/2021 | Delaporte | G06F 1/1643 |
| 2010/0041439 | A1* | 2/2010 | Bullister | G06F 1/165 |
| | | | | 455/566 |
| 2013/0250492 | A1* | 9/2013 | Wong | G06F 1/1641 |
| | | | | 361/679.01 |
| 2016/0212840 | A1* | 7/2016 | Koo | G06F 1/1626 |
| 2016/0246559 | A1* | 8/2016 | Jung | G06F 1/3265 |
| 2018/0101200 | A1* | 4/2018 | Myeong | G06F 1/1681 |
| 2018/0144667 | A1* | 5/2018 | Zhang | G06F 3/0412 |
| 2018/0242466 | A1* | 8/2018 | Lee | G06F 1/1652 |
| 2018/0335679 | A1* | 11/2018 | Hashimoto | G02F 1/13338 |
| 2019/0354138 | A1* | 11/2019 | Araki | G06F 1/1681 |
| 2020/0257334 | A1* | 8/2020 | Han | G06F 3/041 |
| 2021/0026407 | A1* | 1/2021 | Park | H04M 1/0268 |
| 2021/0027667 | A1* | 1/2021 | Lee | G02F 1/133305 |
| 2021/0337686 | A1* | 10/2021 | Sim | H04M 1/0268 |
| 2022/0011814 | A1* | 1/2022 | Ryou | B32B 7/14 |
| 2022/0011815 | A1* | 1/2022 | Min | G06F 1/1637 |
| 2022/0068165 | A1* | 3/2022 | Park | G06F 1/1616 |
| 2022/0206529 | A1* | 6/2022 | Lee | G06F 1/1641 |
| 2022/0206669 | A1* | 6/2022 | Kikukawa | G06F 1/1694 |
| 2023/0114378 | A1* | 4/2023 | Han | G09F 9/301 |
| | | | | 361/679.27 |
| 2023/0136310 | A1* | 5/2023 | Park | G06F 1/1616 |
| | | | | 361/679.01 |
| 2023/0156934 | A1* | 5/2023 | Jiang | G06F 1/1616 |
| | | | | 361/807 |

FOREIGN PATENT DOCUMENTS

| | | |
|---|---|---|
| KR | 10-2016-0061816 A | 6/2016 |
| KR | 10-2017-0095957 A | 8/2017 |
| KR | 10-2020-0037727 A | 4/2020 |
| KR | 10-2278840 B1 | 7/2021 |
| WO | 2013-129846 A | 9/2013 |

* cited by examiner

METHOD FOR FOLDING FOLDABLE DISPLAY DEVICE AND FOLDABLE DISPLAY DEVICE

TECHNICAL FIELD

The present invention relates to a method for folding a foldable display device and a foldable display device including a smartphone and a tablet, in which the foldable display device includes a base panel plate, wherein a second panel plate hinged to one side of the base panel plate is folded such that second panel plate is stacked on the base panel plate, and a first panel plate hinged to the other side of the base panel plate is folded such that the first panel plate is stacked on the second panel plate, and the first and second panel plates are unfolded, so that portions of the display panel, which are repeatedly folded and unfolded, can be stably supported, the display panel can be prevented from being damaged, and a thickness of the foldable display device can be thinner than a conventional foldable smartphone folded once so that a volume thereof can be minimized, thereby providing a display panel that becomes wider when the first and second panel plates are unfolded.

BACKGROUND ART

With the recent development of a display technology, various foldable display devices have been developed.

The foldable display device can be used by users in a folded or unfolded manner according to a use situation, so that a volume of an electronic device can thus be significantly reduced.

The foldable display devices are applied to various fields such as foldable smartphones, tablets, and micro PCs that can be carried by folding or rolling display panels.

For example, a foldable smartphone is a type of smartphone form factor using a flexible display with a hinge.

Devices that are folded along a vertical axis of the display are designed to be unfolded in the form of a wider tablet, but can be also used in a smaller folded state.

That is, the display may be folded to a rear of the device when folded, or may be designed as a booklet in which a larger-sized folded screen is located, or may have a screen cover that allows a user to communicate with the device without opening the screen cover.

In order to fold the foldable smartphone, the foldable smartphone is folded through various methods such as an in-fold method, an in-fold & out method, an inside method, an out-fold method, an in & outside method, etc.

The in-fold method is used in which the foldable smartphone is folded once such that the display panel is attached to an inner peripheral surface of the foldable smartphone to be located inside thereof, and in order to use the foldable smartphone in a folded state, the in-fold & out method is used in which the display panel is attached to an outer peripheral surface of the foldable smartphone.

In the in-fold & out method, the display panel is attached to the outer peripheral surface of the foldable smartphone, and when the foldable smartphone is folded, the display panel is exposed to the outside and is thus highly susceptible to damage.

In addition, the inside method is used by folding the foldable smartphone twice, in which the foldable smartphone is folded once in a "G" shape in a state in which the display panel is attached to the inner circumferential surface of the foldable smartphone, and then a part thereof is folded once again. In this case, when the foldable smartphone is folded, a thickness thereof becomes thicker than that in the in-fold method, so that when the user holds the foldable smartphone by hand, the feeling of grip deteriorates and a volume thereof becomes larger.

In addition, the out-of-fold method has a problem in that when the foldable smartphone is folded once by attaching the display panel to the outer peripheral surface of the foldable smartphone, the display panel is exposed to the outside and is easily damaged by impact.

The in & outside method is used in which the display panel is attached to each of the outer peripheral surface and the inner peripheral surface by folding the foldable smartphone twice in an "S" shape, but has a problem in that the display panel is easily damaged due to external impact because the display panel is attached to the outer peripheral surface.

Meanwhile, in the inside and in & outside methods of folding the foldable smartphone twice, a thickness of the foldable smartphone becomes thicker than that in the in-fold or out-fold method when folded, and it is thus difficult to carry the foldable smartphone by hand, so that there is a limit to apply the inside and in & outside methods to an actual product.

DISCLOSURE

Technical Problem

In order to solve the above problem, an object of the present invention is to provide a foldable display device, in which when the foldable display device is folded twice, a thickness thereof is thinner than a thickness a foldable display device folded once, and a display panel is located on an inner peripheral surface thereof, so that the display panel can be prevented from being damaged, thereby forming a display panel that becomes wider when the foldable display device is unfolded.

Technical Solution

As a solution to the above problem, there is a method for folding a foldable display device of the present invention including:

forming a base panel plate in which a display panel is coupled to an upper surface of the base panel plate;

forming a second panel plate located at one side of the base panel plate and hinged thereto so as to be foldable, formed at one side surface thereof with a second flat surface having a planar shape, to which the display panel is coupled, and formed at the other side surface thereof with a second inclination surface inclined in a diagonal direction, forming a first panel plate located at the other side of the base panel plate and hinged thereto so as to be foldable, formed at one side surface thereof with a first inclination surface which is inclined in a diagonal direction and to which the display panel is coupled, and formed at the other side surface thereof with a first flat surface having a planar shape; folding the second panel plate such that the second flat surface is in close contact with the upper surface of the base panel plate so that the second inclination surface is located on the base panel plate; and folding the first panel plate on the second panel plate so that the first inclination surface is seated on the second inclination surface and folded, wherein when the first panel plate is unfolded, the first inclination surface is horizontally located on an upper surface of the first panel plate, and when the second panel plate is unfolded, the second flat surface is horizontally located on an upper surface of the second panel plate so that the display panel is unfolded.

Advantageous Effects

As described above, according to the method for folding a foldable display device and the foldable display device of the present invention, even if the foldable display device is folded twice, a thickness thereof can be thinner than a thickness of an existing foldable display device folded once, thereby minimizing a volume thereof, when the foldable display device is folded, the display panel is not exposed to the outside thereby enhancing durability, and when the foldable display device is unfolded, a size of the display panel is larger than a size of the foldable display device folded once, thereby providing convenience to a user.

In addition, the foldable display device of the present invention can be applied to a foldable smartphone, a tablet, a micro PC, etc.

DESCRIPTION OF DRAWINGS

FIG. 5 is diagram showing the various methods such as an in-fold method, an in-fold & out method, an inside method, an out-fold method, an in & outside method, etc.

DETAILED DESCRIPTION OF THE INVENTION

In order to achieve the above objects and effects, the present invention will be described in detail with reference to the accompanying drawings.

Figure 1:
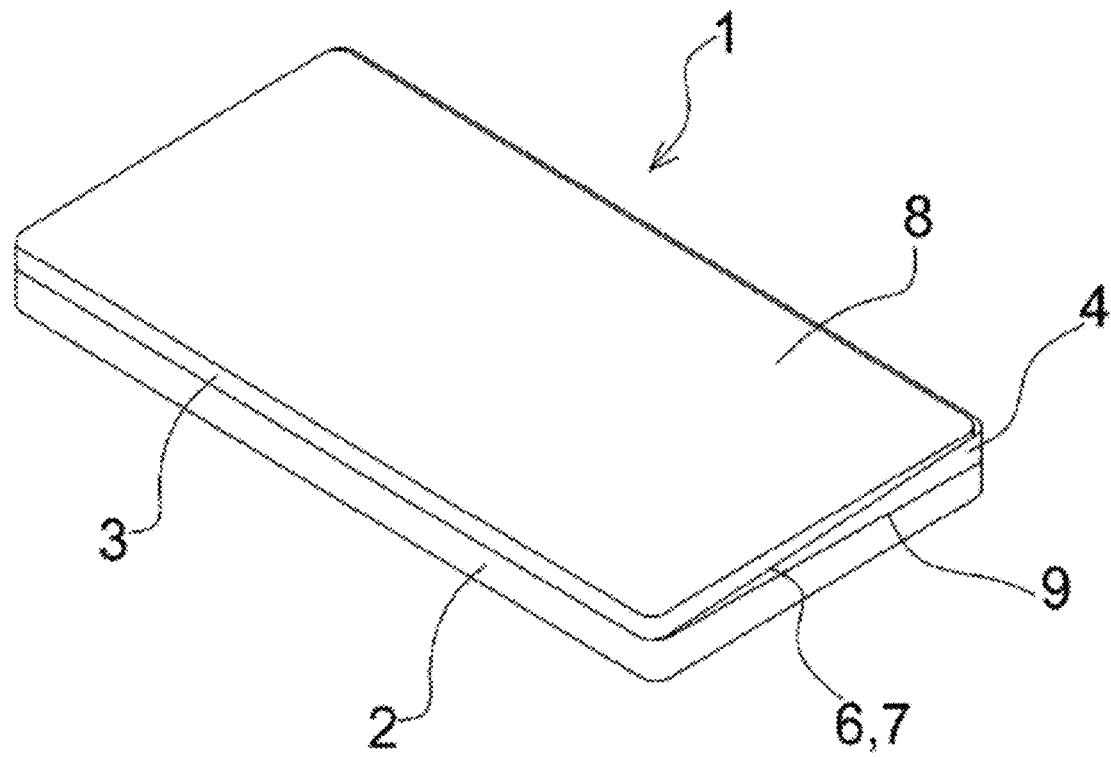
FIG. 1 is a perspective view illustrating a state in which a foldable display device of the present invention is folded.
Figure 2:
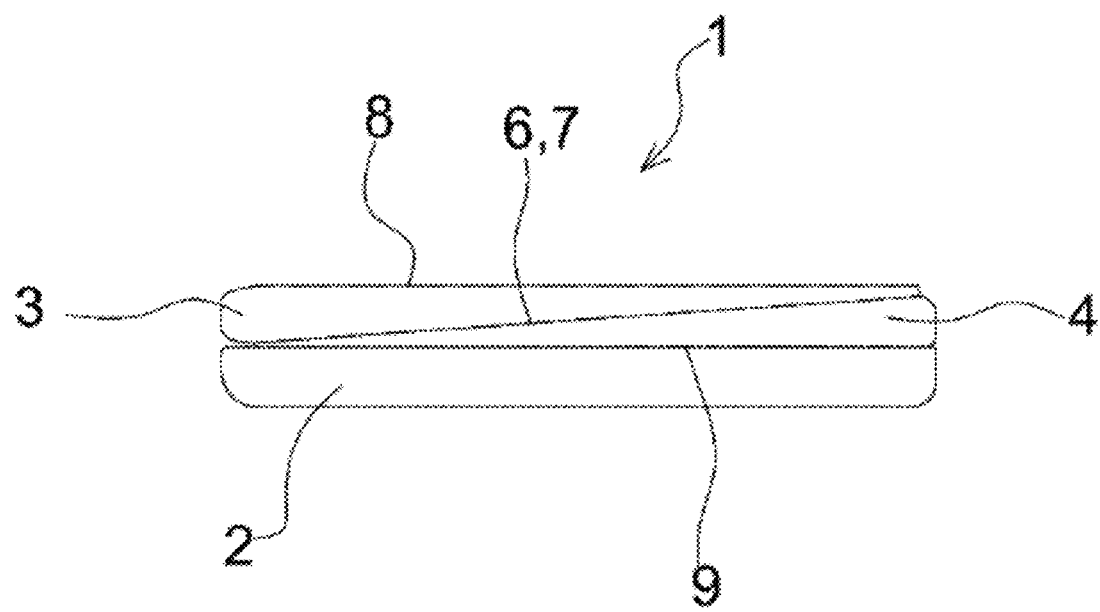
FIG. 2 is a front view illustrating a state in which the foldable display device of the present invention is folded.
Figure 3:
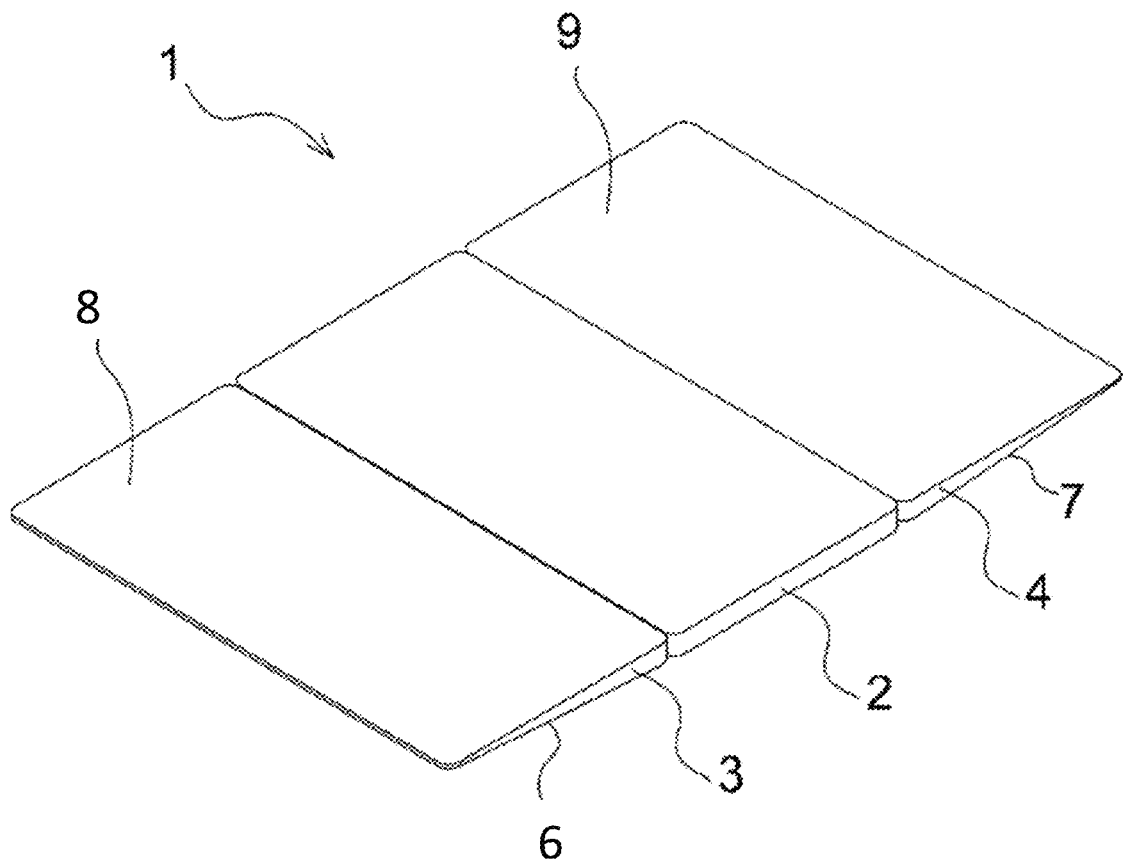
FIG. 3 is a perspective view illustrating a state in which the foldable display device of the present invention is unfolded.

FIG. 1 is a perspective view illustrating a state in which a foldable display device of the present invention is folded, and FIG. 2 is a front view illustrating a state in which the foldable display device of the present invention is folded.

When a foldable display device 1 of the present invention is folded twice by hinging first and second panel plates to both sides of a base panel plate, respectively, and folding each of the first and second panel plates to an upper surface of the base panel plate, the foldable display plate 1 has a thickness formed thinner than that of an existing foldable display device folded once, thereby minimizing a volume thereof.

The foldable display device 1 largely includes a base panel plate 2 and first and second panel plates 3 and 4.

The base panel plate has an upper portion and a lower portion that are in a planar state, and a display panel 5 is coupled to the upper surface thereof.

In a state where the second panel plate 4 is located at one side of the base panel plate 2 and is hinged thereto so as to be foldable, the second panel plate 4 is formed at one side surface thereof with a second flat surface 9 having a planar shape, to which the display panel 5 is coupled, and is formed at the other surface side thereof with a second inclination surface 7 inclined in a diagonal direction.

In a state where the first panel plate 3 is located on the other side of the base panel plate 2 and is hinged thereto so as to be foldable, the first panel plate 3 is formed at one side surface with a first inclination surface 6 which is inclined in a diagonal direction and to which the display panel 5 is coupled, and is formed at the other side surface thereof with a first flat surface 8 having a planar shape.

The foldable display device 1 is in close contact with an inclination surface when folded by forming the inclination surface such that the second inclination surface of the second panel plate and the first inclination surface of the first panel plate are inclined in the diagonal direction.

Meanwhile, although a hinge, which is formed on the base panel plate 2 to fold and unfold the first and second panel plates 3 and 4, is not illustrated in the drawings, the first and second panel plates 3 and 4 may be coupled in various shapes.

In the foldable display device 1, when the second panel plate 4 is folded on the base panel plate 2 such that the second inclination surface 7 is in close contact with the upper surface of the base panel plate 2, the second inclination surface is located on the base panel plate 2.

Accordingly, when the first panel plate 3 is folded on the second panel plate 4, the first inclination surface 6 is seated on the second inclination surface 7 and folded, and thus, even if the foldable display device is folded twice, a thickness thereof is thinner than or similar to that of the foldable display device folded once, so that the user can carry the foldable display device with an excellent feeling of grip.

In addition, when the foldable display device 1 is folded, the display panel 5 is not exposed to the outside and is located inside thereof, thereby protecting the display panel 5 from external impact and enhancing durability.

On the contrary, when the first panel plate 3 is unfolded, the first inclination surface 6 is horizontally located on the upper surface of the first panel plate 3, and when the second panel plate 4 is unfolded, the second flat surface 9 is horizontally located on the upper surface of the second panel plate 4, so that the folded display panel 5 is unfolded.

Although the first and second panel plates are not illustrated in the drawings, the first and second panel plates are maintained in a horizontally unfolded state by the base panel plate and the hinge, thereby providing a display panel 5 that is wider than the display panel 5 of the conventional foldable display device 1 folded and unfolded once.

The foldable display device 1 is applied with a foldable smartphone, a tablet, and a micro PC.

Figure 4:
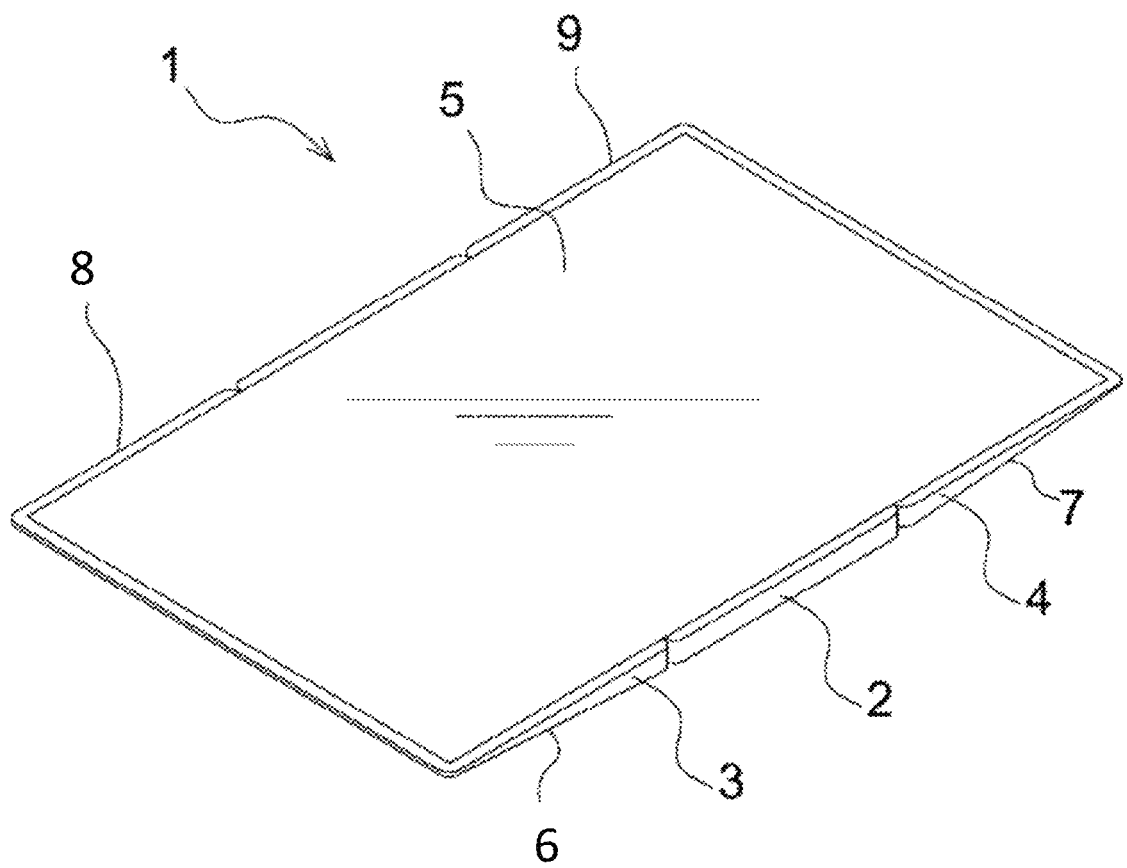
FIG. 4 is a perspective view illustrating a foldable display device according to another embodiment of the present invention.

FIG. 4 is a perspective view illustrating a foldable display device according to another embodiment of the present invention, in which one display panel 5 is installed on the upper surfaces of the base panel plate 2, the first panel plate 3, and the second panel plate 4 to be used in a folded or unfolded manner.

Alternatively, the base panel plate 2, the first panel plate 3, and the second panel plate 4 may be provided with independent display panels 5, respectively.

REFERENCE SIGNS LIST

1: foldable display device 2: base panel plate
3: first panel plate 4: second panel plate
5: display panels 6: first inclination surface
7: second inclination surface 7 8: first flat surface
9: second flat surface

The invention claimed is:

1. A method for folding a foldable display device, the method comprising:

forming a base panel plate (2) in which a display panel (5) is coupled to an upper surface of the base panel plate (2); forming a second panel plate (4) located at one side of the base panel plate (2) and hinged thereto so as to be foldable, formed at one side surface thereof with a second flat surface (9) having a planar shape, to which the display panel (5) is coupled, and formed at the other side surface thereof with a second inclination surface (7) inclined in a diagonal direction;

forming a first panel plate (3) located at the other side of the base panel plate (2) and hinged thereto so as to be foldable, formed at one side surface thereof with a first inclination surface (6) which is inclined in a diagonal direction and to which the display panel (5) is coupled, and formed at the other side surface thereof with a first flat surface (8) having a planar shape; folding the second panel plate (4) such that the second flat surface (9) is in close contact with the upper surface of the base panel plate (2) so that the second inclination surface is located on the base panel plate (2); and folding the first panel plate (3) on the second panel plate (4) so that the first inclination surface (6) is seated on the second inclination surface (7) and folded, wherein when the first panel plate (3) is unfolded, the first inclination surface (6) is horizontally located on an upper surface of the first panel plate (3), and when the second panel plate (4) is unfolded, the second flat surface (9) is horizontally located on an upper surface of the second panel plate (4) so that the display panel (5) is unfolded.

2. The method of claim 1, wherein one display panel is installed on the upper surfaces of the base panel plate, the first panel plate, and the second panel plate so as to be folded or unfolded.

3. The method of claim 1, wherein the foldable display device is a foldable smartphone or a tablet.

4. A foldable display device comprising:

a base panel plate (2) in which a display panel (5) is coupled to an upper surface of the base panel plate (2);

a second panel plate (4) located at one side of the base panel plate (2) and hinged thereto so as to be foldable, formed at one side surface thereof with a second flat surface (9) having a planar shape, to which the display panel (5) is coupled, and formed at the other side surface thereof with a second inclination surface (7) inclined in a diagonal direction; and a first panel plate (3) located on the other side of the base panel plate (2) and thereto so as to be foldable, formed at one side surface thereof with a first inclination surface (6) which is inclined in a diagonal direction and to which the display panel (5) is coupled, and formed at the other side surface thereof with a first flat surface (8) having a planar shape, wherein the first panel plate (3) and the second panel plate (4) are folded on the base panel plate (2), and when the first and second panel plates (3 and 4) are unfolded, the base panel plate (2), the first inclination surface (6), and the second flat surface (3) are unfolded in a planar state.

\* \* \* \* \*

UNITED STATES PATENT AND TRADEMARK OFFICE
CERTIFICATE OF CORRECTION

| | | |
|---|---|---|
| PATENT NO. | : 11,947,394 B2 | Page 1 of 1 |
| APPLICATION NO. | : 18/042184 | |
| DATED | : April 2, 2024 | |
| INVENTOR(S) | : Min Woo Jung | |

It is certified that error appears in the above-identified patent and that said Letters Patent is hereby corrected as shown below:

On the Title Page

Item [12]:
Chung
Should read:
Jung

Item [71] and [72]:
Min Woo Chung, Jinju-si (KR)
Should read:
Min Woo Jung, Jinju-si (KR)

Signed and Sealed this
Twenty-seventh Day of August, 2024

Katherine Kelly Vidal
*Director of the United States Patent and Trademark Office*